June 21, 1960 R. S. RAREY ET AL 2,941,521
ENGINE HEAD
Filed July 21, 1958 4 Sheets-Sheet 4

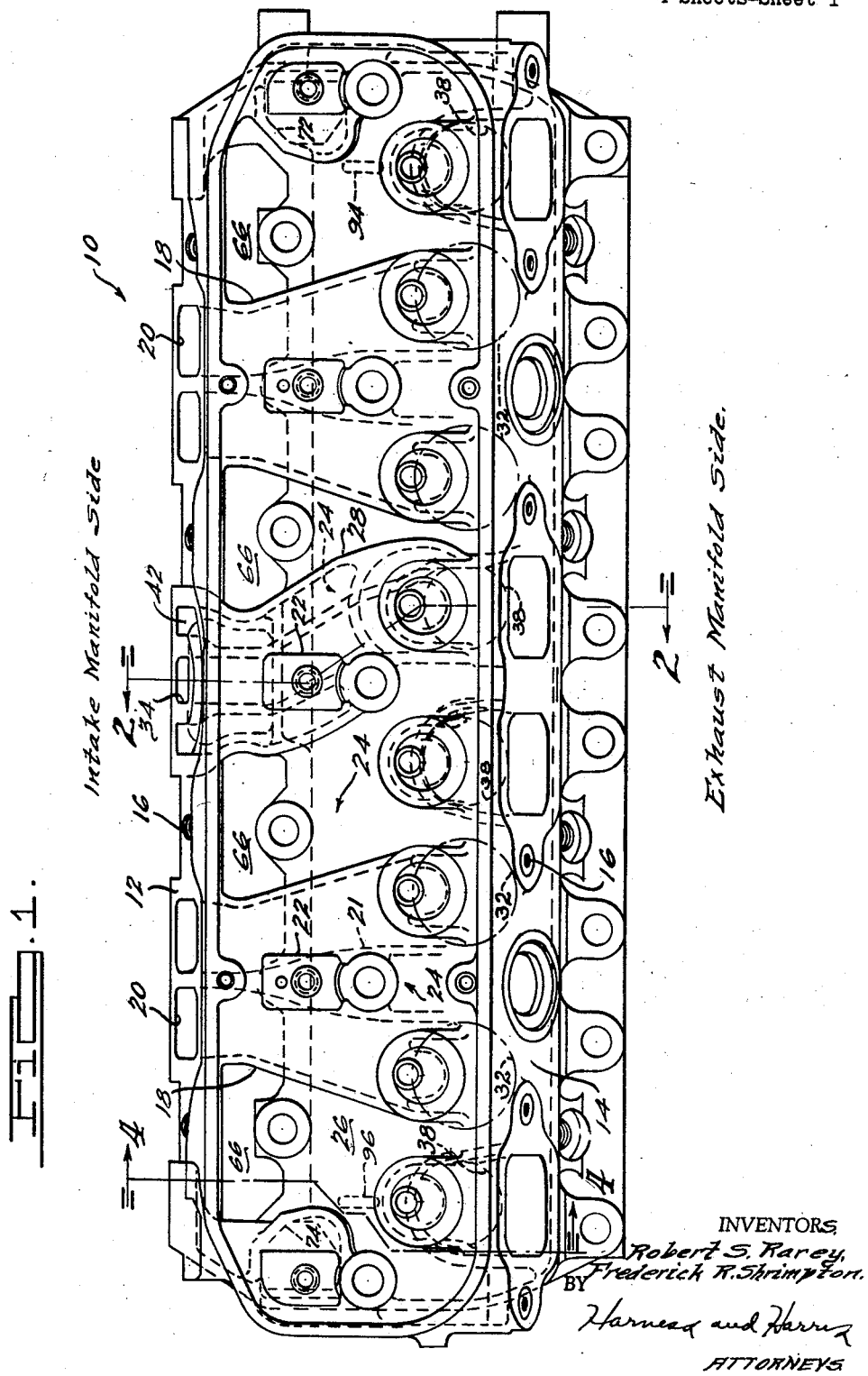

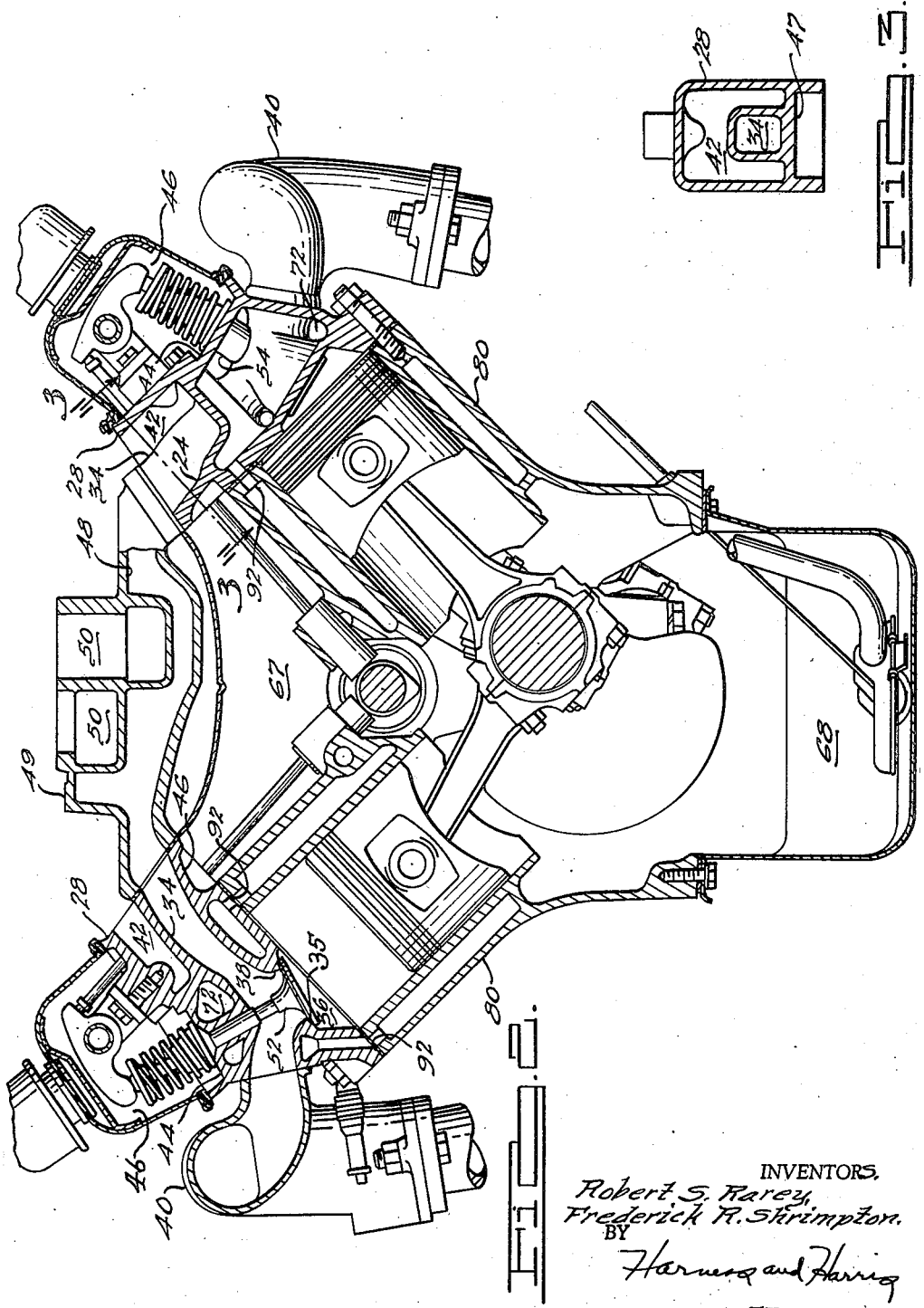

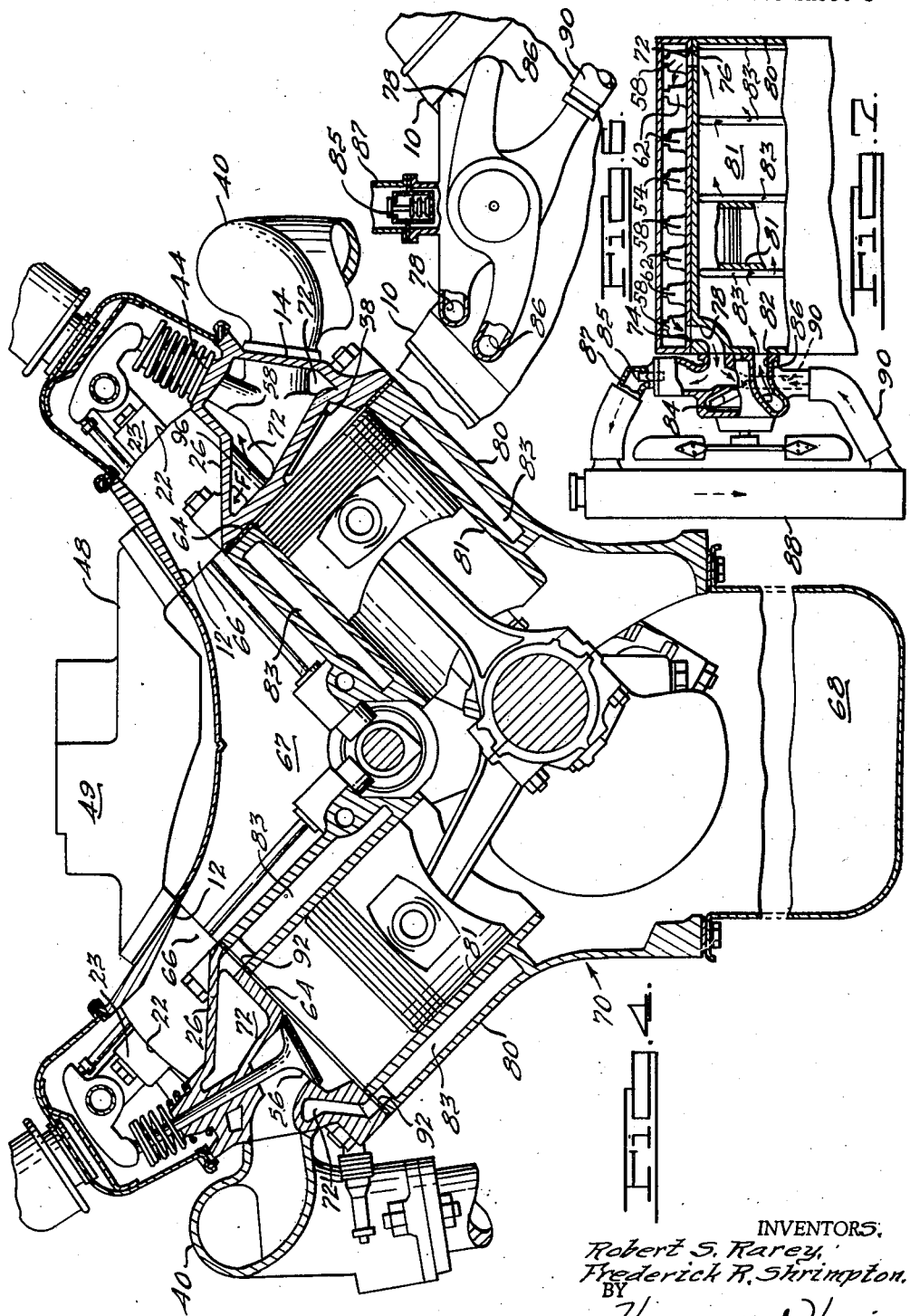

INVENTORS.
Robert S. Rarey,
Frederick R. Shrimpton.
BY
Harness and Harris
ATTORNEYS.

United States Patent Office 2,941,521
Patented June 21, 1960

2,941,521

ENGINE HEAD

Robert S. Rarey, Birmingham, and Frederick R. Shrimpton, Detroit, Mich., assignors to Chrysler Corporation, Highland Park, Mich., a corporation of Delaware Filed July 21, 1958, Ser. No. 749,703

18 Claims. (Cl. 123—41.82)

This invention relates to internal combustion engines of the V-type and especially to a lightweight V-8 engine of this character provided with cylinder heads having reduced coolant volume without sacrifice of cooling characteristics and having an improved oil drainage structure and exhaust crossover heating structure.

Among the principal features of this invention is a V-engine construction which combines within each head a hot spot conduit or passage cooled by an air jacket lying intermediate this conduit and the floor of the rocker chamber; a plurality of oil drain back walls defining in part passages interconnecting the rocker arm chamber and a tappet chamber lying intermediate the opposite cylinder banks; a water coolant chamber of greatly reduced volume extending longitudinally of each head at the outer part thereof directly over the combustion chambers of the cylinders of its bank and connecting with the water jackets of the latter and defined partly by the exhaust manifold mounting wall on one side, by the said air jacket wall on the other, by the rocker chamber base wall at the top and the combustion chamber walls at the bottom to provide part of a liquid coolant circulatory path which takes advantage of the reduced coolant chamber cross sectional area to provide increased velocity cooling water to the liquid coolant system. The combined features are also productive of a cylinder head of substantially reduced weight.

In typical V-8 engines currently used, an intake manifold is positioned intermediate a pair of cylinder banks and connected to the intake manifold mounting walls of a pair of cylinder heads mounted on the V-shaped block. A plurality of intake conduits located in the heads and operatively connected to the intake valve ports therein communicate through passages in said manifold with the air-fuel mixture chamber of a carburetor mounted on said intake manifold. Conventionally, a hot spot crossover operatively linking hot spot conduits in the two heads passes underneath the carburetor to provide a "hot spot" which applies the exhaust gas heat locally to the fuel-air mixture in the carburetor risers and thereby preheats the air-fuel mixture fed in intake passages to the engine. Such an arrangement is particularly advantageous for cold starts when both fuel and engine are well below the temperature at which the fuel vaporizes sufficiently to provide the minimum fuel to air ratio for combustion.

The flow of exhaust gas through these hot spot conduits is conventionally controlled by a thermostatically operated valve usually located in the main exhaust line which valve is closed when the exhaust gases are cold and open when they are hot. When the valve is closed the exhaust gas from the cylinder banks tends to move back and forth through the hot spot crossover conduits in a pulse like manner but when the valve is open the major portion of the exhaust gases passes out through the main exhaust line. Heretofore, the hot spot conduits in the head have been separated from the floor of the rocker arm chamber by a water cooling passage which passage extended from the intake side of the head to the exhaust side thereof to thereby prevent overheating of the rocker chamber. The present invention avoids this condition by insulating the hot spot conduit over its major length in the head by an air jacket which is open at its inner end.

Also typically provided in these conventional engines are a series of relatively small apertures extending completely through the heads to provide drain back passages for the rocker arm assembly lubricating oil. These apertures are conventionally located at each end of the head adjacent the exhaust side thereof and are limited in size by the water cooling chamber and head wall boundaries. The size of these apertures heretofore have been adequate under normal operating conditions of the engine to carry the rocker assembly lubricating oil back to the oil sump. However, under high carbonizing engine conditions and high lubricating oil feed pressures experienced in modern high compression engines, these apertures sometimes become partially clogged which condition results in a slow down in the circulation of the oil and consequent sludge formation on the rocker chamber surface of the head. This sludge is not desirable in the engine since it is likely to cause gumming of the engine bearing oil passages. The present head provides a plurality of longitudinally spaced large chambers or conduits connecting the tappet and rocker arm chambers, these conduits having oil drain back walls defined by portions of the cooling chamber and the air jacket which portions are so inclined with respect to the floor of the rocker arm chamber and the engine as to insure a complete unretarded return flow of any lubricating oil pumped to the rocker arm assembly.

The water coolant passage of reduced cross section and partly defined by the plurality of oil drain back walls further distinguishes from conventional cooling system arrangements in engine heads in that it has its inlet means and outlet means located in opposite ends respectively of the head whereby the coolant fluid entering it is required to flow the entire length of the head before it is discharged therefrom. The single inlet and outlet insures a more constant and uniform heat exchange throughout the entire length of the head since the flow volume of coolant throughout the coolant passage is constant from one end to the other. Also the reduced cross section of the coolant passage produces a greater rate of flow past the valve guides and seats and the inner end of the aforementioned air jacket than would occur in the conventional head supplied with an equal amount of coolant.

Another feature of this invention is the provision of a single coolant outlet in each of the cylinder banks at the rear thereof which outlet coincides in position with the single inlet at the rear of each head. The banks also are provided with a single coolant inlet at the front thereof and coolant entering the banks must flow from the front to the rear of the banks before it is discharged into the heads. Since the heads must discharge the coolant only at their front outlet, a series flow of coolant is established between the cylinder banks and their associated heads. As mentioned above, this flow throughout the entire length of the heads and also throughout the entire length of the cylinder banks insures an equal flow volume past all the coolant chamber surfaces in both the cylinder banks and the heads.

An object of this invention is to provide a lightweight engine head having greatly increased oil drain back wall area and decreased cooling passage area relative to conventional heads.

Another object of this invention is to provide in an engine head a hot spot conduit which is insulated from the floor of the rocker arm chamber by an air space.

Another object of this invention is to combine in a single engine head the structure comprising a large oil drain back wall area, a decreased cooling passage area relative to conventional engine head cooling passages, a series coolant flow inlet and outlet, and a hot spot conduit insulated from the floor of a rocker arm chamber by an air space, A better understanding of the invention can be had with reference to the drawings, in which:

Figure 1 is a top elevational view of the head;

Figure 2 is a transverse cross sectional view of the V-engine taken in the vertical plane of the hot spot conduit of the head of Figure 1 taken substantially along a line corresponding to 2—2 of Figure 1 in the direction of the arrows;

Figure 4 is a transverse cross sectional view of the V-engine taken in the plane of the exhaust valves along a line corresponding to 4—4 of Figure 1 in the direction of the arrows;

Figure 5 is a transverse cross sectional view of a V-engine head taken in the plane of the intake valves;

Figure 6 is a front elevational view of the water pump housing mounted on a V-engine; and Figure 7 is a side view of a portion of the V-engine partly in cross section showing the cooling passages.

Figure 3:
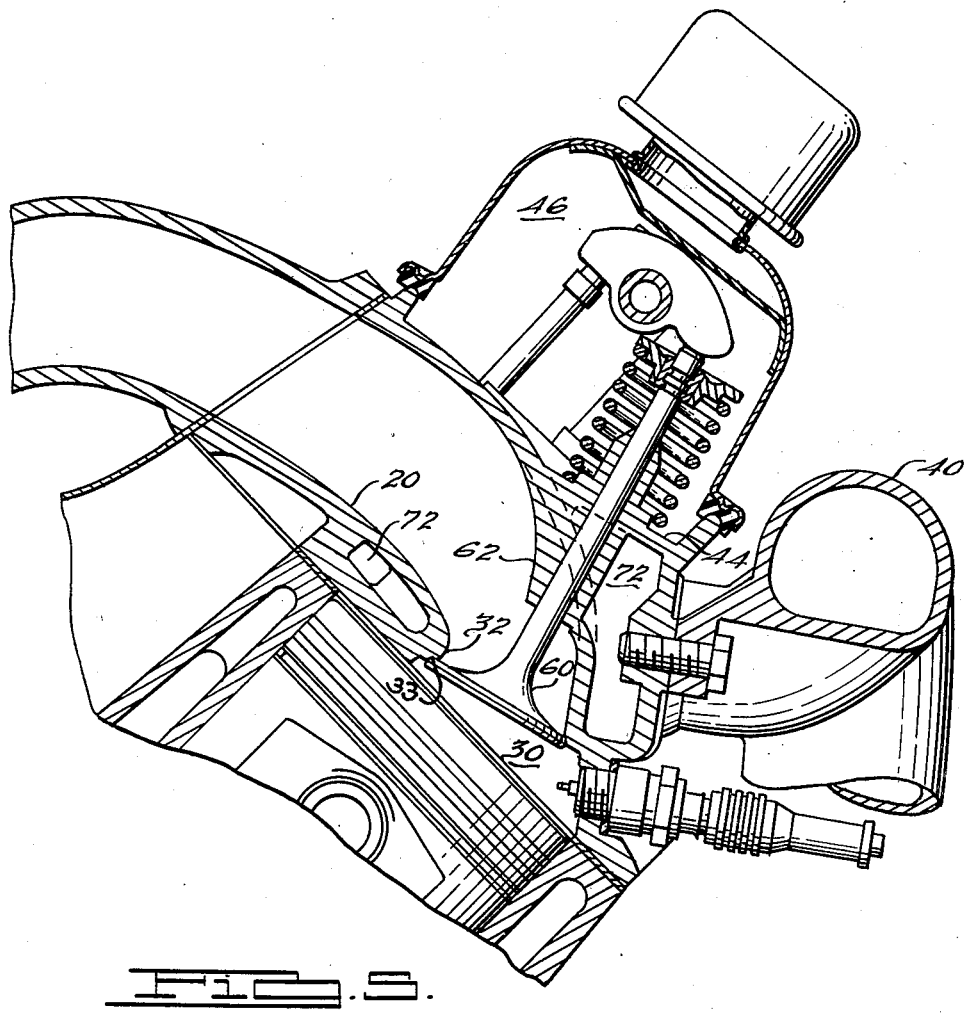
Figure 3 is a cross sectional view of the hot spot conduit portion of the right hand head of Figure 2 taken on line 3—3 of Figure 2 in the direction of the arrows.

Referring to the drawings and in particular to Figure 1, a V-engine head designated generally as 10 is provided with an intake manifold mounting wall 12, and an exhaust manifold mounting wall 14 having suitable exhaust ports therein, each wall being provided with threaded apertures 16 in which manifold attaching bolts may be secured. Two intake conduit housings 18 each having two conduits 20 side by side therein and an air jacket housing 28 extend substantially across the head, and have attachment projections 22 on their upper surfaces for accommodating rocker shaft mounts 23 (see Figure 4). Housings 18 and 28 are integral at their lower and exhaust side edges with an intermediate sloping wall generally designated 24 which is coextensive with walls 26 and extends the full length of the head, being broken in its contour by the housings 18 and air jacket housing 28 and by the openings of intake conduits 20 and the hot spot conduit 34 through the wall 24. Portions of this wall are shown in Figures 1, 2, and 5.

Referring to Figures 1 and 2, air chamber jacket or housing 28 on each head being integral at its lower edges with sloping wall 24 is spaced from and surrounds a hot spot conduit or exhaust gas conduit 34 which communicates with a single combustion chamber 36 in each head through exhaust ports 38 therein. Each hot spot conduit 34 also communicates with an exhaust manifold branch 40 on each head, these branches forming a single exhaust conduit posterior of the engine. Air spaces 42 between the air jacket housing 28 and the conduits 34 insulate the bottom wall 44 of the rocker chamber from the heat of the exhaust gases in the conduits 34. It is noted that walls 44 of the rocker chambers form the top walls of the head and are comprised of the alternating cavities having sloping bottom portions or walls 26 coextensive with and formed by the contour of the sloping wall 24 and the housings 18 and 28 integral therewith. These bottom portions 26 of the cavities provide drain back walls for the rocker assembly lubricating oil and are inclined slightly below the horizontal axis of the engine and toward vertical axis of the engine when the heads are mounted on the engine and the engine is in its normal operating position. Conduits 34 and jacket housings 28 have a common bottom wall portion 47 as shown in Figure 3. The conduits 34 in each head are interconnected by the hot spot crossover 48 of the intake manifold and passes underneath and around the risers 50 of a carburetor mounted on the manifold. The exhaust valves 52 which are operatively associated with the hot spot conduits 34 are mounted in sleeves 54 which open into the rocker chambers 46 and the conduits 34. The remaining exhaust valves 56 (see Figure 4) are mounted in sleeves 58 which open into the rocker chambers 46 and into the exhaust conduits in the conventional manner. As shown in Figure 5, the intake valves 60 are mounted in sleeves 62 which open into the rocker chambers 46 and intake conduits 20 in the conventional manner. Intake and exhaust valve seats 33 and 35 are conventionally provided respectively in the intake ports 32 and exhaust ports 38 in each head.

Referring further to Figures 1 and 4, the sloping walls 26 of the heads merge with the bottom walls 64 of the heads at a point removed from the intake manifold mounting wall 12 to form the oil drain back apertures 66 which communicate with the tappet chamber 67 and oil sump 68 of the engine 70 when the heads 10 are properly mounted on the engine 70. A liquid coolant chamber 72 having a portion thereof of a substantially wedge-shaped cross section throughout a large portion of its length and having other portions thereof of restricted size and different shapes extends substantially the length of each head and is formed by the insides of the bottom wall 64, the sloping wall 24, the top wall 44, and the exhaust manifold mounting wall 14 of each head. The intake and exhaust conduits and valve sleeves, and the hot spot conduits and air jacket housings in each head produce variations in the wedge-shaped cross section and restrictions in the coolant chamber 72 of each head, a few of which restrictions are numbered 72 in Figures 2, 4, and 5. It is noted that the liquid coolant must flow at a greater rate through these restrictions than through the full wedge-shaped sections to maintain a full coolant chamber and a constant volume flow therethrough.

Referring to Figures 1, 6, and 7 liquid coolant inlet aperture 72 and outlet aperture 74 are provided in opposite ends of each head 10 and are adapted to communicate with an outlet aperture 76 and a discharge conduit 78 respectively in each cylinder bank 80 of the engine. A liquid coolant inlet aperture 82 is provided in each bank 80 and receives liquid coolant from the coolant circulatory pump 84 through pump outlets or conduits 86. In the circulation of the coolant as represented by the arrows in Figure 7, the coolant is discharged from the pump 84 through the outlets or conduits, through inlets 82 and 86 and into each cylinder bank 80 wherein it flows or circulates from front to rear around the cylinder walls 81 through passage 83 which is continuous and completely surrounds each cylinder wall. The coolant is then discharged from the rear of each bank through the outlets 76 and into the rear of each cylinder head 10 through the inlets 72. The coolant then flows or circulates toward the front of each head past the valve sleeves 54, 58, and 62 and past the inside of wall 24 and coextensive walls 26 and the inner end of the air jacket 28, and discharges through outlet 74 into the conduit 78 and into the outlet side of the pump 84 from which side it may flow into the radiator inlet conduit 87 past the thermostat 85 when said thermostat is open into the radiator 88 and back to the intake side of the pump 84 through conduit 90. Normally, a portion of the liquid flowing from the heads will be pumped directly back into the blocks even though the thermostat 85 is open. When the thermostat is closed, all of the liquid from the heads will be pumped directly back into the blocks. A small portion of the liquid coolant or vapor passes from the cylinder banks up into the heads through slits 92 which serve mainly as vapor vents for the cylinder banks. Baffles 94 and 96 (Figures 1 and 4) projecting up from opposite ends of the bottom wall 64 of heads 10 within their coolant chambers 72 aid in distributing and circulating the coolant flow around the valve guides and ports in said chambers as shown in Figure 4 by the flow arrows F directed to either side of baffle 96.

We claim:

1. In a V-type internal combustion engine having heads carrying intake and exhaust valves, exhaust gas crossover conduit portions in each head communicating with a single exhaust valve in each of said heads, an intake manifold having a hot spot crossover conduit interconnecting said conduit portions in said heads, a carburetor mounted on said manifold in close proximity to said hot spot crossover conduit, a recess in each of said heads in close juxtaposition to said conduit portions therein and forming air chambers to provide a cooling gradient for the exhaust gas in said hot spot crossover conduit to prevent said carburetor from becoming overheated.

2. In an internal combustion engine having a cylinder head, an intake and an exhaust valve mounted therein, said intake valve communicating through an intake manifold with the interior of a carburetor, and said exhaust valve communicating through a conduit in said cylinder head with the exterior of a portion of said carburetor to convey exhaust gases thereto to preheat the fuel in said carburetor, an air chamber jacket on said cylinder head partially surrounding said conduit in said cylinder head and being coextensive with the top of said head, said jacket being vented to the atmosphere to provide an air space between said conduit and the top of said head.

3. In an internal combustion multicylinder engine of the V-type having a pair of cylinder banks and cylinder heads mounted thereon, each said cylinder head having an intake and an exhaust valve therein for each cylinder in said head, an exhaust gas conduit portion in each said head communicating with said exhaust valves in each said head, an intake manifold interconnecting said cylinder heads, said manifold having conduits therein connecting the intake valves of said cylinder banks to a carburetor, said manifold having a crossover conduit portion therein communicating with the exhaust gas conduit portion in each said head and communicating with said carburetor to supply exhaust gas heat thereto, a transverse recess in each said head partially surrounding the exhaust gas conduit portion in each said head to provide an air cooling chamber for exhaust gas in said exhaust gas conduit portions and to reduce the amount of metal in each said head without substantially reducing head rigidity.

4. In a V-type internal combustion engine having a block with a pair of cylinder banks and heads thereon, said heads having an intake mounting wall, a rocker arm chamber on each said head, an exhaust gas conduit segment on each said head communicating with a single exhaust port of each said head, a crossover exhaust gas conduit bridging said conduit segments in said heads and adapted for communication with the exterior of a carburetor, an air jacket on each said head partially surrounding said conduit segments therein, the wall of each said jacket extending inwardly from the intake mounting wall of each said head to partially define a cooling passage in each said head, a slanting wall disposed on either side of each said jacket terminating short of said intake mounting wall and communicating with the rocker arm chamber of each said head and with the oil sump of said engine.

5. An internal combustion engine of the V-type having a block, a pair of cylinder banks integral with and extending from said block, an oil sump intermediate said banks, a cylinder head on each of said banks, each of said heads having a plurality of in-line intake and exhaust valves operatively mounted therein in sleeves, a rocker arm chamber partially defined by the top of each said head, an oil drain back wall on each of said heads communicating with said rocker arm chamber, said walls being inclined downwardly with respect to the horizontal axis of said engine from the exhaust manifold side of each said head and communicating with said oil sump, a reduced cooling passage in each said head being partially of the contour and partially defined by the inner sides of said drain back walls, said cooling passage extending the full length of each said head and surrounding said sleeves, an exhaust gas conduit on each of said heads communicating with a single exhaust valve port in each of said heads, an intake manifold having a carburetor mounted thereon, a hot spot crossover conduit communicating with said carburetor and connecting said exhaust gas conduits of said heads to provide a passage for exhaust gas to the exterior of said carburetor, an air cooling jacket integral with each said drain back wall and surrounding each said exhaust gas conduit to provide an insulating air space between said exhaust gas conduits, said drain back walls, and said rocker arm chambers.

6. In a V-type internal combustion engine having a block with two cylinder banks thereon and an oil sump intermediate said banks, a cylinder head on each said bank having a plurality of in-line exhaust and intake valves operatively mounted in sleeves therein, each said head having a top and bottom surface and an intake and exhaust wall, the top surface of each said head forming the bottom surface of a rocker arm chamber, said bottom surface of each said chamber being inclined from said exhaust wall of each said head downwardly with respect to the horizontal axis of said engine, said bottom surfaces communicating with said oil sump through ports adjacent the inner edge of each said bottom surfaces to provide drain back walls for the rocker arm chamber lubricating oil, a hot spot crossover conduit operatively connected to each said head and communicating with a single exhaust valve port on each said head, an air cooling jacket integral with said bottom surface and spaced from and partially surrounding each said conduit, said jacket forming part of said bottom surface of said rocker arm chamber, a cooling passage extending longitudinally of each said head and surrounding said sleeves, said passages being partially defined by the inside of said drain back walls, a coolant inlet on the underside of the rear end of each said head adjacent the inner edge of each said drain back wall, each said inlet adapted to coincide with a coolant outlet in each said cylinder bank to receive coolant therefrom, a baffle projection inside of each said passage and adjacent each said inlet to aid in circulating the incoming coolant to all sides of said valve sleeves, an outlet conduit on the front end of each said head communicating with each said passage through a coolant outlet, said outlet conduit being positioned on the topmost portion of each said head.

7. In a V-type engine having a block with two cylinder banks extending therefrom and an oil sump intermediate said banks, a cylinder head on each bank, said heads having a plurality of intake and exhaust valves mounted in sleeves therein, said heads having three faces forming a triangular shaped cross section throughout a major portion of their longitudinal axis, one face of each said head adapted for use as the floor surface of a rocker arm chamber, an exhaust gas conduit on each said head projecting through said one face and an adjacent face of each said head, each said adjacent face having intake and exhaust ports therein, each said exhaust gas conduit being connected to one of said exhaust ports, an air cooling jacket on each said one face spaced from and partially surrounding each said exhaust gas conduit, said jackets interrupting the continuity of said faces, a plurality of intake conduits extending at spaced intervals through each said one face and through each said adjacent face and adapted to be connected to said intake ports on each said adjacent face, said intake conduits further interrupting the continuity of each said one face, a plurality of drain back ports through each said one face and each said adjacent face, each said head adapted to be so positioned on each said cylinder bank as to locate said drain back ports in overlying relationship with respect to said oil sump.

8. A cylinder head for a V-engine, said head comprising a top wall, a bottom wall and a side wall, drain portions of said top wall being inclined downwardly and inwardly with respect to the horizontal and vertical axis respectively of the engine and adapted for use as the floor of a rocker arm chamber, a water passage extending longitudinally through said head, a plurality of intake valve mounting sleeves positioned in said passage and bridging said top wall and said bottom wall, the portions of said sleeves adjacent said bottom wall being enlarged to provide intake ports, an intake conduit connected to said enlarged portion of each said sleeve and extending through said top wall intermediate said drain portions thereof, and a drain back port through each of said drain portions adapted to communicate with an oil sump on said engine.

9. In a cylinder head for a V-type engine, said cylinder head having an intake port side, an exhaust port side, a top surface adapted to be used as the floor of a rocker arm chamber, and a bottom surface forming a plurality of combustion chambers, at least one of said chambers having an intake and an exhaust valve seat therein, the additional structure comprising a plurality of intake conduits forming portions of said top surface and extending transversely across said top surface in a plane substantially parallel to said bottom surface, a plurality of drain back gulleys forming portions of said top surface intermediate said conduits and slanting downwardly with respect to the horizontal axis of the engine when installed thereon from the exhaust port side of said top surface to the intake port side of said top surface, said gulleys meeting said bottom surface short of said intake port side of said head to form oil drain back ports through said head.

10. In a V-engine cylinder head having a top surface forming part of a rocker arm chamber and having an exhaust gas conduit operatively connected to an exhaust port in said head, a metal jacket partially surrounding said conduit in spaced relationship thereto and being open at one end to the atmosphere, said jacket providing an insulating air space between said conduit and said top surface of said head.

11. A V-type internal combustion engine comprising a block having a pair of cylinder banks thereon, an oil sump integral with said block intermediate said banks and communicative therewith, a cylinder head on each of said banks having a plurality of intake and exhaust valves mounted thereon, an exhaust gas conduit extending through a wall of each said heads and communicating with a single one of said exhaust valves therein, said conduits adapted to be operatively connected together by a hot spot crossover conduit, an air jacket integral with each said wall and partially surrounding each said conduit in spaced relationship thereto to provide an insulating air space partially surrounding each said conduit.

12. A head for a V-type internal combustion engine comprising an elongated member having a plurality of longitudinally spaced segments of wedge-shaped cross section, a water passage within said member being partially defined by said segments, said passage extending substantially the full length of said member and having a wedge-shaped cross section throughout a substantial portion of its length, a plurality of intake and exhaust valve mounting sleeves longitudinally spaced along said passage, a first and second surface on said member, said sleeves connecting said surfaces, said first surface having a plurality of intake and exhaust valve seats thereon opening into said intake and exhaust valve sleeves respectively, said second surface providing the bottom surface of a rocker arm chamber, an exhaust gas conduit extending through said second surface and into one of said exhaust valve sleeves to communicate with the interior thereof, a portion of said second surface overlying an exposed portion of said exhaust gas conduits in spaced relationship thereto to provide an insulating air space between said portion and said second surface.

13. A cylinder head for a V-type engine comprising an elongated body of generally rectangular transverse section having an intake manifold mounting wall and an exhaust manifold mounting wall at opposite sides thereof and having a top wall for mounting a rocker mechanism cover to define a rocker chamber and a bottom wall for mounting said head on the engine block, a plurality of cavities spaced longitudinally of said head and extending between said top and bottom walls, each said cavity defined in part by a wall extending longitudinally of said head intermediate said manifold mounting walls, the portion of this intermediate wall in said cavity sloping generally divergingly from said top wall to said bottom wall in the direction of said intake manifold mounting wall and defining an oil drain surface, an aperture through said head adjacent the lower end of said portion of said intermediate wall in said cavity, said intermediate wall also defining with said top and bottom walls and said exhaust manifold mounting wall a liquid coolant chamber, a plurality of intake valves having bearing portions extending between said top and bottom walls in said coolant chamber each defining a valve seat at its lower end, a combustion fuel conducting conduit extending transversely from each said valve seat through said intermediate wall to said intake manifold mounting wall and terminating therein, each of said conduits having a wall portion facing on one of said cavities, an exhaust gas conduit extending transversely between said side walls and through said intermediate wall, and a U-shaped conduit overlying said exhaust gas conduit and extending between said intake wall and said intermediate wall and having a common wall portion with said exhaust gas conduit, said U-shaped conduit terminating in an opening in said intake manifold mounting wall.

14. A cylinder head for a V-type engine comprising an elongated body of generally rectangular transverse section having an intake manifold mounting wall and an exhaust manifold mounting wall at opposite sides thereof and having a top wall for mounting a rocker mechanism cover to define a rocker chamber and a bottom wall for mounting said head on the engine block, a plurality of cavities spaced longitudinally of said head and extending between said top and bottom walls each said cavity defined in part by a wall extending longitudinally of said head intermediate said manifold mounting walls, the portion of this intermediate wall in said cavity sloping generally divergingly from said top wall to said bottom wall and defining an oil drain surface, said intermediate wall also defining with said top and bottom walls and said exhaust manifold mounting wall a liquid coolant chamber, a plurality of longitudinally spaced intake and exhaust valve mounting means extending between said top and bottom walls in said chamber, each said means providing a valve port having a valve seat, an intake conduit extending from each port of said intake valve mounting means through said intermediate wall to said intake manifold mounting wall and terminating therein, each of said conduits having common wall portions with said top and bottom walls, an exhaust conduit extending from a port of a single one of said exhaust valve mounting means through said intermediate wall and to said intake manifold mounting wall and terminating therein, said conduit having a common wall portion with said bottom wall, a jacket spaced from and surrounding said exhaust conduit, said jacket being defined in part by said top and bottom walls, said jacket extending from said intermediate wall to said intake manifold mounting wall and terminating therein, said jacket having an opening in said intake manifold mounting wall.

15. A cylinder head for a V-type engine comprising an elongated body of generally rectangular transverse section having an intake manifold mounting wall and an exhaust manifold mounting wall at opposite sides thereof and having a top wall for mounting a rocker mechanism cover to define a rocker chamber and a bottom wall for mounting said head on the engine block, a plurality of cavities spaced longitudinally of said head and extending between said top and bottom walls each said cavity defined in part by a wall extending longitudinally of said head intermediate said manifold mounting walls, the portion of this intermediate wall in said cavities sloping generally divergingly from said top wall to said bottom wall and defining oil drain surfaces, said intermediate wall also defining with said top and bottom walls and said exhaust manifold mounting wall a liquid coolant chamber, a plurality of intake and exhaust valve mounting means extending between said top and bottom walls in said chamber, said means and said intermediate, top, bottom, and exhaust manifold mounting walls defining restricted passages in said coolant chamber, each said mounting means providing a valve seat and a valve port on said head, an intake conduit extending from each port of said intake valve mounting means through said intermediate wall and to said intake manifold mounting wall and terminating therein, each of said conduits having common wall portions with said top and bottom walls, an exhaust conduit extending from a port of a single one of said exhaust valve mounting means through said intermediate wall and to said intake manifold mounting wall and terminating therein, said conduit having a common wall portion with said bottom wall, a jacket spaced from and surrounding said exhaust conduit, said jacket being defined in part by said top and bottom walls, said jacket extending from said intermediate wall to said intake manifold mounting wall and terminating theerin, said jacket having an opening in said intake manifold mounting wall.

16. A cylinder head for a V-type engine comprising an elongated body of generally rectangular transverse section having an intake manifold mounting wall and an exhaust manifold mounting wall at opposite sides thereof and having a top wall for mounting a rocker mechanism cover to define a rocker chamber, a bottom wall for mounting said head on the engine block, a plurality of cavities spaced longitudinally of said head and extending between said top and bottom walls, each said cavity defined in part by a wall extending longitudinally of said head intermediate said manifold mounting walls, the portion of this intermediate wall in said cavity sloping generally divergingly from said top wall to said bottom wall and defining an oil drain surface, said intermediate wall also defining with said top and bottom walls and said exhaust manifold mounting wall a liquid coolant chamber, a water inlet and a water outlet aperture in said bottom and top wall respectively at opposite ends of said head for allowing cooling water circulation through said coolant chamber, a plurality of intake valve mounting means extending between said top and bottom walls in said chamber each defining a valve seat and port at its lower end, a combustion fuel conducting conduit extending transversely from each said valve port through said intermediate wall to said intake mounting wall and terminating therein, each of said conduits having a wall portion facing on one of said cavities, an exhaust crossover conduit extending transversely between said side walls and through said intermediate wall, and a U-shape conduit overlying said crossover conduit and extending between said intake wall and said intermediate wall and having common wall portions with said crossover conduit and said top wall, said U-shaped conduit terminating in an opening in said intake manifold mounting wall.

17. A cylinder head for a V-type engine comprising an elongated body of generally rectangular transverse section having an intake manifold mounting wall and an exhaust manifold mounting wall at opposite sides thereof and having a top wall for mounting a rocker mechanism cover to define a rocker chamber and a bottom wall for mounting said head on the engine block, a plurality of cavities spaced longitudinally of said head and extending between said top and bottom walls, each said cavity defined in part by a wall extending longitudinally of said head intermediate said manifold mounting walls, the portions of this intermediate wall in said cavities sloping generally divergingly toward said intake manifold mounting wall from said top wall to said bottom wall and defining oil drain surfaces, said intermediate wall also defining with said top and bottom walls and said exhaust manifold mounting wall a liquid coolant chamber of substantially wedge-shape transverse section, a plurality of intake valve mounting means extending between said top and bottom walls in said chamber and each defining a valve seat and port at its lower end, a combustion fuel conducting conduit extending transversely from each said valve port through said intermediate wall to said intake manifold mounting wall and terminating therein, each of said conduits having a wall portion facing one of said cavities, an exhaust crossover conduit extending transversely between said mounting walls and through said intermediate wall, and a U-shape conduit overlying said crossover conduit and extending between said intake mounting wall and said intermediate wall and having common wall portions with said crossover conduit and said top wall, said U-shaped conduit terminating in an opening in said intake manifold mounting wall.

18. In a V-engine cylinder head having a top surface forming part of a rocker arm chamber and having an exhaust gas conduit extending through said top surface and operatively connected to an exhaust port in said head, a portion of said top surface forming a jacket partially surrounding a portion of said conduit exteriorly of said head in spaced relationship to said conduit portion to define an air chamber, said chamber being open at one end to the atmosphere and providing an insulating air space between said conduit and said top surface of said head.

References Cited in the file of this patent
UNITED STATES PATENTS

| | | |
|---|---|---|
| 2,270,546 | Neuland | Jan. 20, 1942 |
| 2,769,434 | Witzky | Nov. 6, 1956 |